L. M. GILLIAM.
CIGARETTE MACHINE.
APPLICATION FILED MAR. 18, 1914.

1,227,549.

Patented May 22, 1917.
9 SHEETS—SHEET 1.

Witnesses:
A. R. Appleman
W. H. Hawkins.

Inventor,
LAWRENCE M. GILLIAM,
By his Attorneys
Meyers, Cushman & Rea

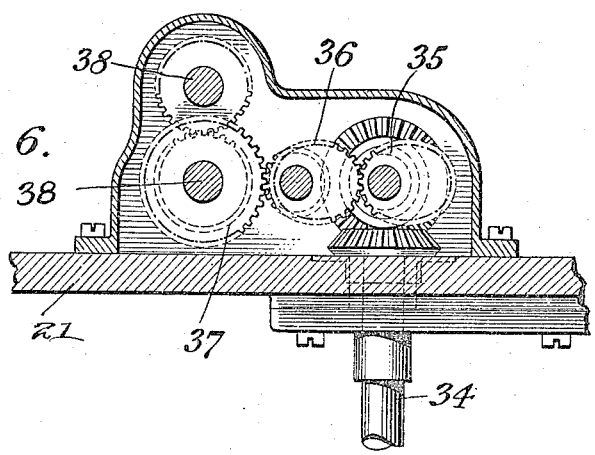
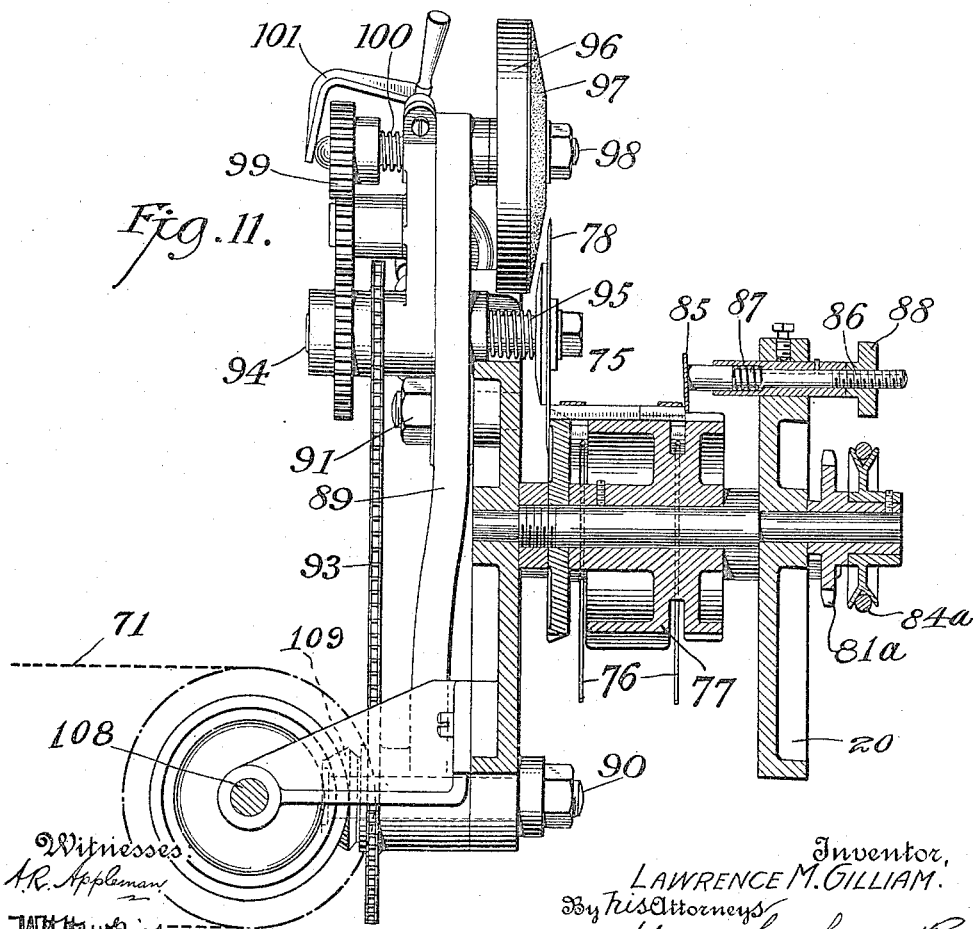

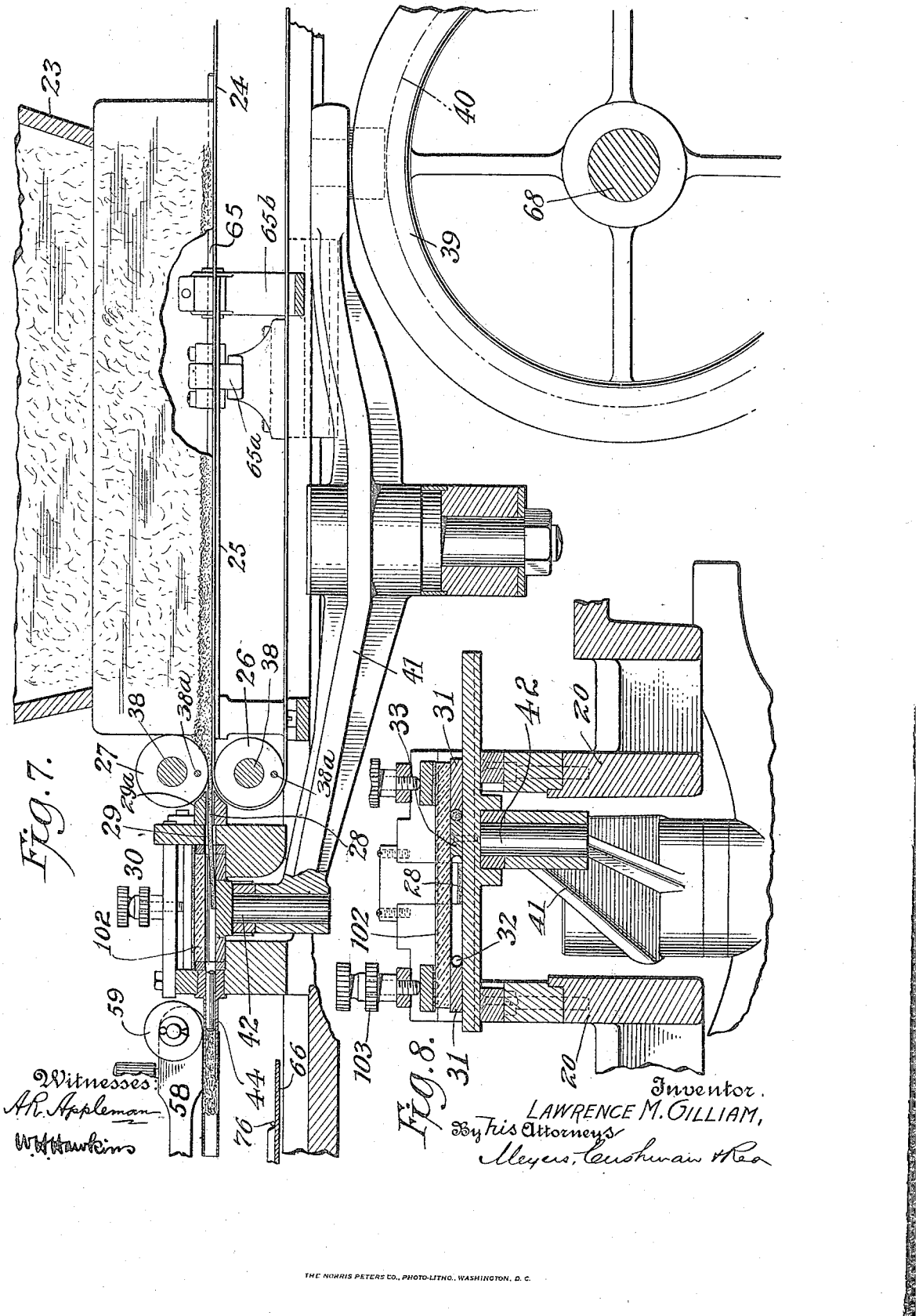

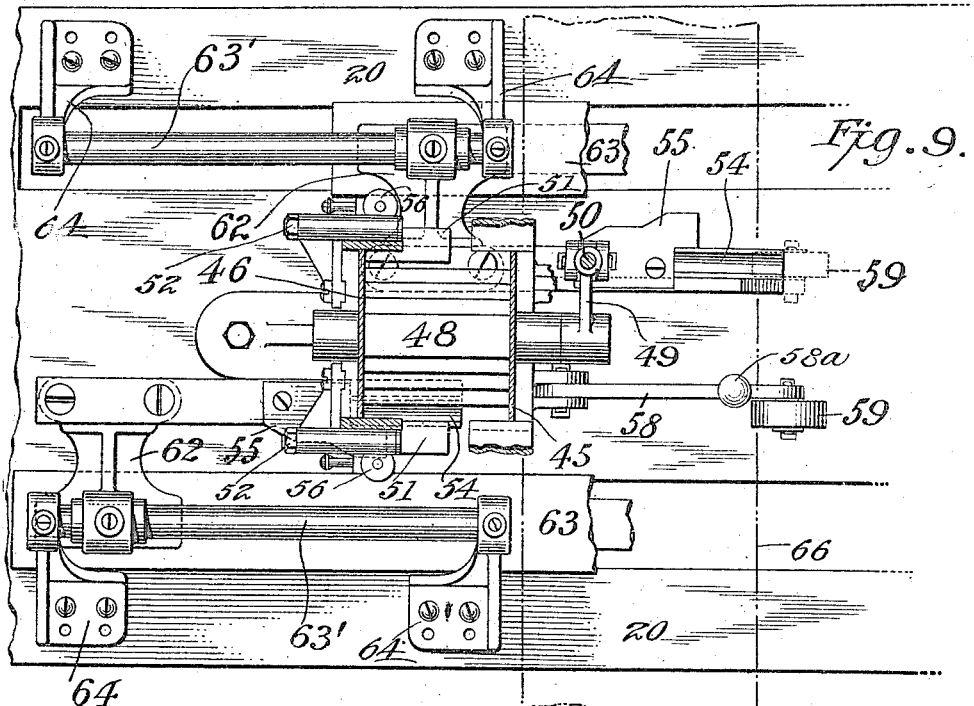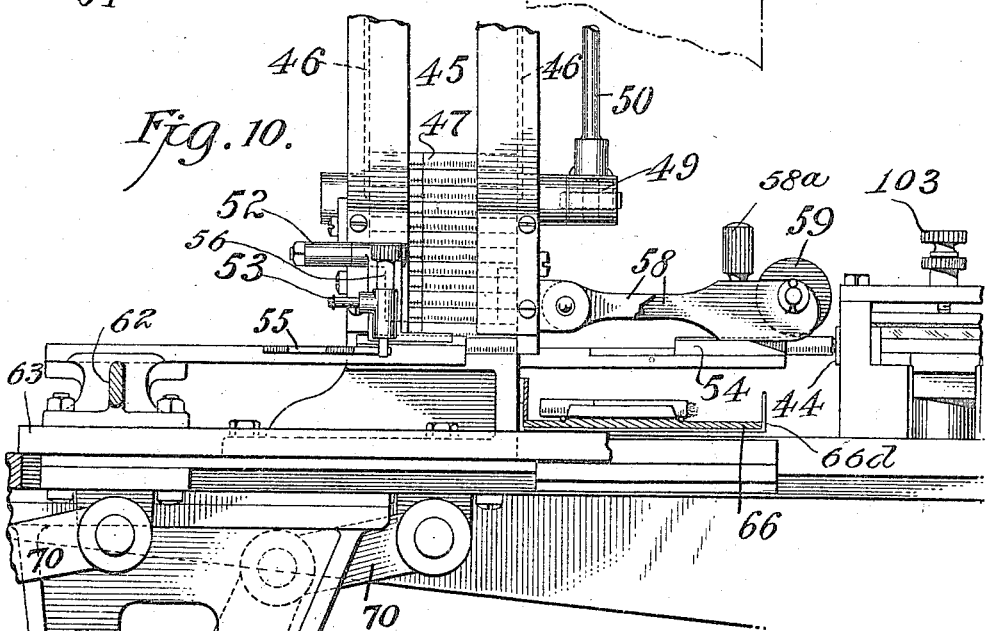

L. M. GILLIAM.
CIGARETTE MACHINE.
APPLICATION FILED MAR. 18, 1914.
1,227,549.
Patented May 22, 1917.
9 SHEETS—SHEET 9.
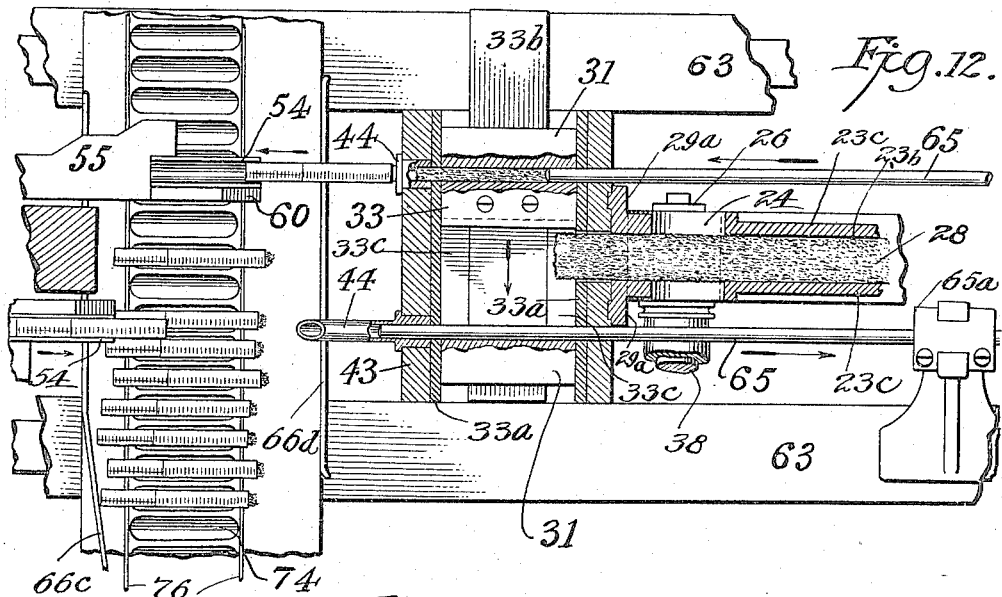
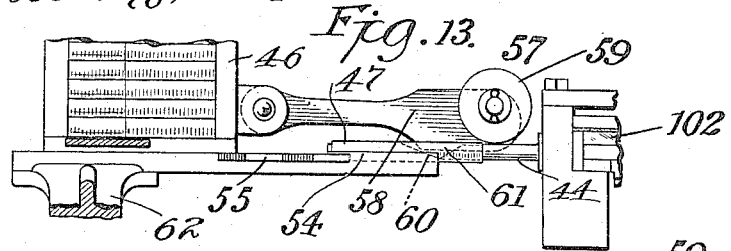
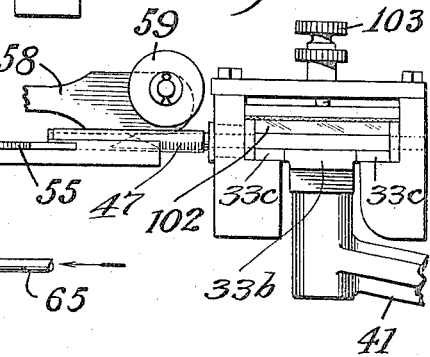
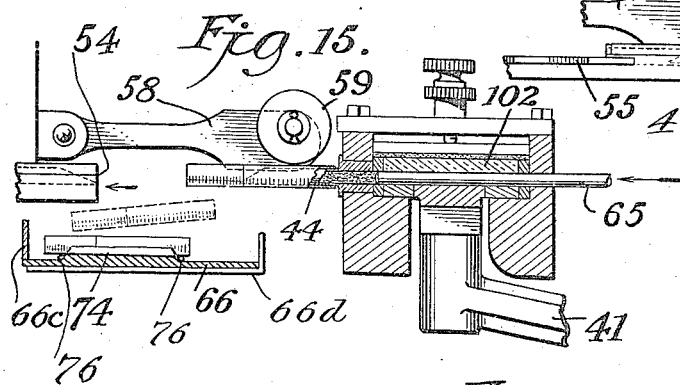
Witnesses:
A. R. Appleman
W. H. Hawkins
Inventor,
LAWRENCE M. GILLIAM,
By his Attorneys
Meyers, Cushman & Rea

UNITED STATES PATENT OFFICE.

LAWRENCE M. GILLIAM, OF SAN FRANCISCO, CALIFORNIA, ASSIGNOR TO LIGGETT & MYERS TOBACCO COMPANY, OF ST. LOUIS, MISSOURI, A CORPORATION OF NEW JERSEY.

CIGARETTE-MACHINE.

1,227,549.  Specification of Letters Patent.  Patented May 22, 1917.

Application filed March 18, 1914. Serial No. 825,509.

*To all whom it may concern:*

Be it known that I, LAWRENCE M. GILLIAM, a citizen of the United States, residing at San Francisco, in the county of San Francisco and State of California, have invented new and useful Improvements in Cigarette-Machines, of which the following is a specification.

This invention relates to a machine for making cigarettes and more particularly for making what are known in the trade as Russian mouth-piece cigarettes.

Machines for this purpose have been employed in which the tobacco is given cigarette form and is then forced into a paper tube or case, the said machines also including mechanism for making the tubes or cases, which mechanism is of itself more or less intricate, and these combined machines are, therefore, very complicated and easily rendered inoperative for this reason.

One of the objects of this invention is to provide a machine which will operate with cases which have been previously formed by other and separate mechanism and to provide improved means for shaping the tobacco preparatory to introducing it into these cases.

In the preferred form of the machine the tobacco is pressed into rod form and this rod of tobacco is then forced into the case. One of the objects of this invention is to provide an arrangement whereby the fibers of tobacco will tend to arrange themselves longitudinally in the finished cigarette, which is not only desirable, but is necessary to the formation of a well filled and well dressed free drawing cigarette.

A further object of the invention is to produce a machine which is very simple in construction and having parts readily accessible for adjustment or making repairs.

I am aware that a machine for making cigarettes has been suggested, constructed in such a way as to form a continuous ribbon of tobacco and that the machine operated in such a way that longitudinal lengths were cut from the ribbon and pressed into rod form. In one of these machines referred to, the tobacco was carried toward the mold between two moving belts which pushed the tobacco through an opening into the mold. The motion of these belts was intermittent, the mode of operation consisting substantially in stopping the belts periodically so as to permit a knife located before the opening of the mold to cut across the ribbon and sever the portion of the ribbon within the mold from the ribbon. This mode of operation occasions delay on account of the time consumed in arresting the belt and also tends to produce nonuniformity in the cigarettes on account of the inertia of the tobacco on the belt which tends to continue its state of rest or motion whenever the belt has started or stopped.

One of the objects of the present invention is to produce a machine in which the belt feeding the tobacco into the mold moves continuously and uninterruptedly, and thereby increases the output of the machine and bring about greater uniformity in the character of the tobacco rods formed in the mold; it is also one of the objects of the invention to provide improved means for insuring a substantially uniform distribution of tobacco in the tobacco ribbon.

In certain types of these machines, the belt which carries the tobacco to the mold travels longitudinally of a slot in the bottom of a feed hopper in which the tobacco falls freely in a finely shredded condition. It has been observed that there is a tendency for the tobacco to clog itself between the belt and the edges at the lower side of the slot. One of the objects of the present invention is to overcome this defect.

A further object of the invention is to improve the mechanism for cutting the finished cigarettes of uniform length and particularly to provide a construction which will facilitate the nice adjustment of the knife with relation to the cigarettes which it is to cut.

A further object of the invention is to provide means for facilitating the discharge of the tobacco rod from the mold.

Other objects of the invention will appear more fully hereinafter.

In the drawing which illustrates a preferred form of the invention—

Fig. 6 is a section illustrating means for giving the feed rollers variable speed.

Fig. 7 is a longitudinal section, certain parts being broken away illustrating the manner in which the tobacco is showered onto the feed belt and the manner in which it is passed from the feed belt into the mold, and thereafter delivered into the case.

Fig. 8 is a cross section taken through the mold and illustrating details of its construction and operation.

Fig. 9 is a plan particularly illustrating the gates and particularly illustrating the feed mechanism which feeds the cases forward from the case hopper in order to enable them to be filled with tobacco.

Fig. 10 is a side elevation and partial section showing certain of the parts shown in Fig. 9.

Fig. 11 is an elevation and partial section showing the trimming mechanism for cutting the cigarettes to uniform length.

Fig. 12 is a plan and partial section, certain parts being broken away, particularly illustrating the construction and operation of the mold and the arrangement for packing the cigarette cases and delivering the same.

Fig. 13 is a detail illustrating means for transferring and holding the cigarette case on the holder while it is being filled with tobacco.

Fig. 14 is an end elevation of the mold and showing contiguous parts.

Fig. 15 is a vertical section through the mold and illustrating the manner in which the packer rods force the rod of tobacco from the mold into the case, and also showing the manner in which the filled cases are delivered onto the delivery belt.

Fig. 16 is a longitudinal section through a finished cigarette.

Figure 1:
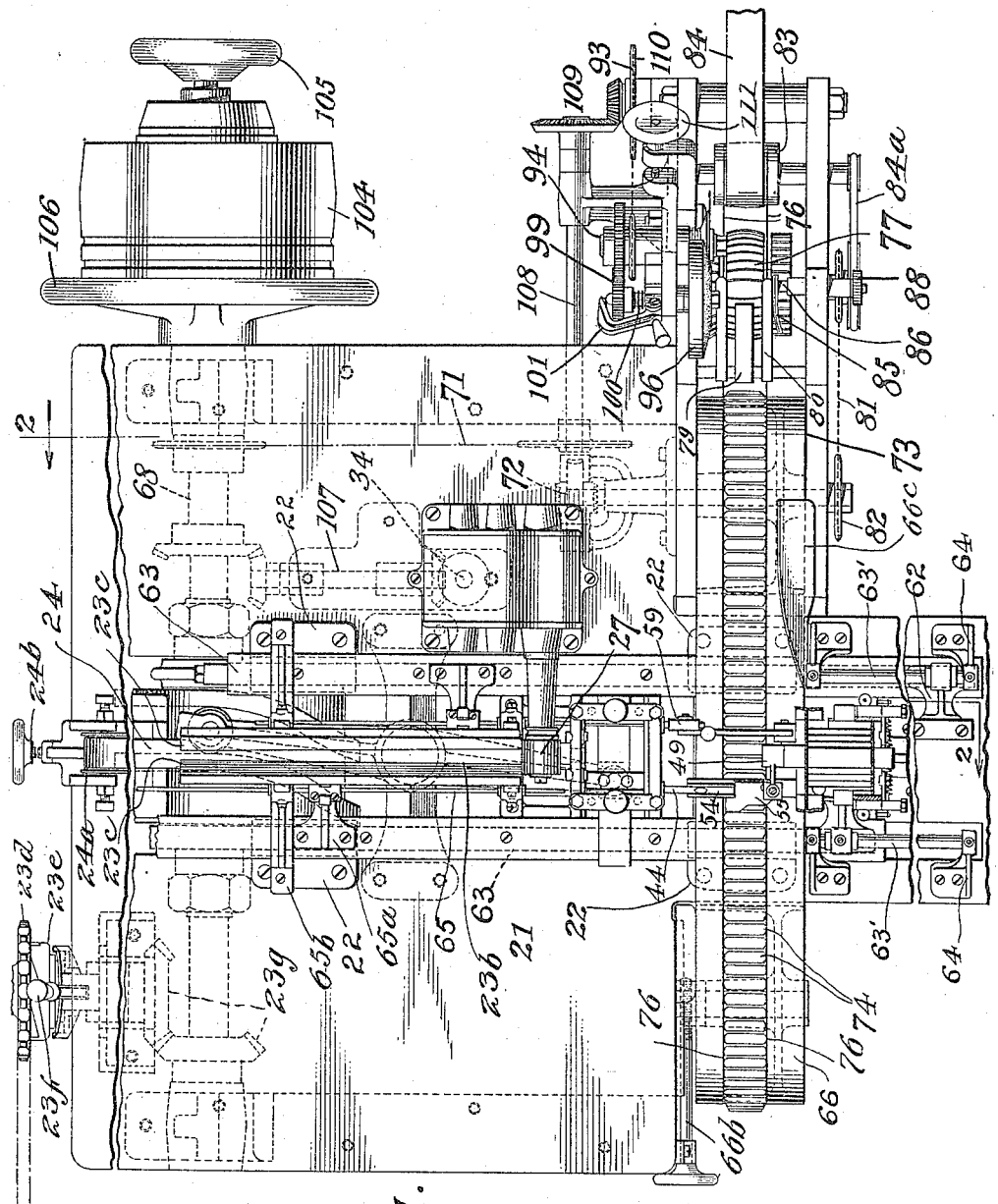
Figure 1 is a plan, the hopper which holds the cases being removed.

Referring more particularly to the parts, 20 represents the frame of the machine, which is preferably surmounted by a table 21 and provided with guides 22, which extend in a front and rear direction for a purpose which will appear more fully hereinafter.

Referring particularly to Fig. 7, above the table 21 there is provided a feed hopper 23 through which the tobacco is showered down by means of any suitable tobacco feeding apparatus $23^a$ so that it falls upon a horizontal belt 24, the upper run of which passes forwardly, running on top of a guide plate 25, beyond which it passes around a lower guide roller 26. This belt is driven continuously at a variable speed as hereinafter described. Above the guide roller 26 there is provided a compressing means or roller 27, which rolls or compresses the tobacco into a relatively narrow ribbon 28 and advances it through a guide opening 29 into the interior of a mold 30. The operation of this belt 24 and the rollers 26 and 27 tends to arrange the fibers of the tobacco longitudinally of the belt or longitudinally of the feed movement of the ribbon of tobacco which is fed forwardly by the belt.

The bottom of the hopper 23 is preferably formed with a longitudinal slot $23^b$ formed between strips $23^c$ and through this slot the tobacco falls onto the belt. By reason of this slot the tobacco forms itself into a ribbon on the belt. This slot preferably increases gradually in width in the direction toward which the belt travels and this tends to prevent the tobacco from choking into the space between the belt and the strips $23^c$.

The rear pulley $24^a$ for the feed belt 24 is adjustable by screw $24^b$ to tighten this belt.

At the rear of the machine a sprocket wheel $23^d$ is provided which will be driven when a clutch $23^e$ is closed by lever $23^f$. This clutch is driven by bevel gears $23^g$ from shaft 68. The sprocket wheel $23^d$ is for driving the feed mechanism $23^a$ but the connection to the same is not illustrated.

Means is provided for condensing this ribbon into a round form of rod of tobacco preparatory to filling the cases, and this is preferably accomplished by means of the mold 30. This mold is preferably constructed as illustrated in Fig. 12, that is, it preferably comprises two separated oppositely disposed fixed mold sections 31, which as illustrated in Fig. 8 are simple flat plates with adjacent edges formed with longitudinal grooves 32. Between these grooves 32 a movable part 33 reciprocates and coöperates alternately with the fixed mold-sections 31; that is, it passes to and fro between parallel side strips $33^a$ crosses the path of the ribbon and severs a portion from the length of the ribbon and compresses it against one or the other of the fixed mold parts; that is, it takes or severs from the ribbon approximately a cigarette length of tobacco at each stroke and compresses it into a rod. The movable mold part 33 is carried by a slide plate $33^b$ sliding between guide plates $33^c$. While the movable part 33 is compressing the tobacco for one cigarette at one side, a space or opening is left on the other side of the mold for the entrance of the ribbon of tobacco for the formation of another cigarette. Preferably the mechanism is arranged so that the rollers 26 and 27 rotate at a greater speed at this moment so that no time is lost in passing the tobacco into the mold. But the feed rollers 26 and 27 are rotating very slowly as the movable mold part moves across the path of the ribbon and severs a portion of tobacco from it to form a tobacco rod. Any suitable mechanism may be employed to get the effect such as that illustrated in Fig. 6, wherein a vertical shaft 34 driven by any suitable means transmits movement to two meshing elliptical gears 35 and 36, the movement of which is imparted through a suitable gear 37 to the shafts 38 of the rollers 26 and 27.

The elliptical gears are so set as to minimize the amount fed into the mold when the movable mold-part is severing the ribbon. On the other portion of the revolution these same elliptical gears cause the rolls to revolve quite rapidly, forcing a charge into the mold in the interval that ensues after the movable mold part has cut off the tobacco and is holding it compressed in the mold through the operation of the cam wheel 39. Hence it is evident that these rollers 26 and 27 do not revolve at a steady speed, but revolve intermittently at a high and a low speed. But as the rollers 26 and 27 are always rotating, the tobacco moves uninterruptedly toward or into the mold. It is evident that the movable mold part 33 moves at a high speed as it cuts across the ribbon of tobacco. As the tobacco at this time is moving in at a slow speed, the passing of the mold part 33 does not interfere in any way with the perfect operation of the machine.

The two feed roll shafts 38 have small dowel pins 38$^a$ (Fig. 7) which engage with the rollers 26 and 27 to rotate them. These rollers are held in place by suitable screws and washers which enable the rollers to be readily removed. The tobacco ribbon is guided through the opening 29 from the belt 24 by two guides 29$^a$ which have concave faces fitting the peripheries of the rollers or belt as seen in Fig. 7. These guides also scrape adhering tobacco off the roller 27 or belt 24.

Preferred means for reciprocating the movable mold part 33 is illustrated in Fig. 7, and this may be accomplished by means of a large cam wheel 39 having a cam slot 40, which operates a lever 41, the said lever having a pin and slot connection 42 with the underside of the movable mold part 33. This cam slot 40 is arranged so that after the full pressure has been exerted upon the movable mold part to enable it to coöperate with one of the fixed mold parts and produce a tobacco rod, this pressure is slightly relieved or released preparatory to forcing the tobacco rod out of the mold into the cigarette case.

Figure 3:
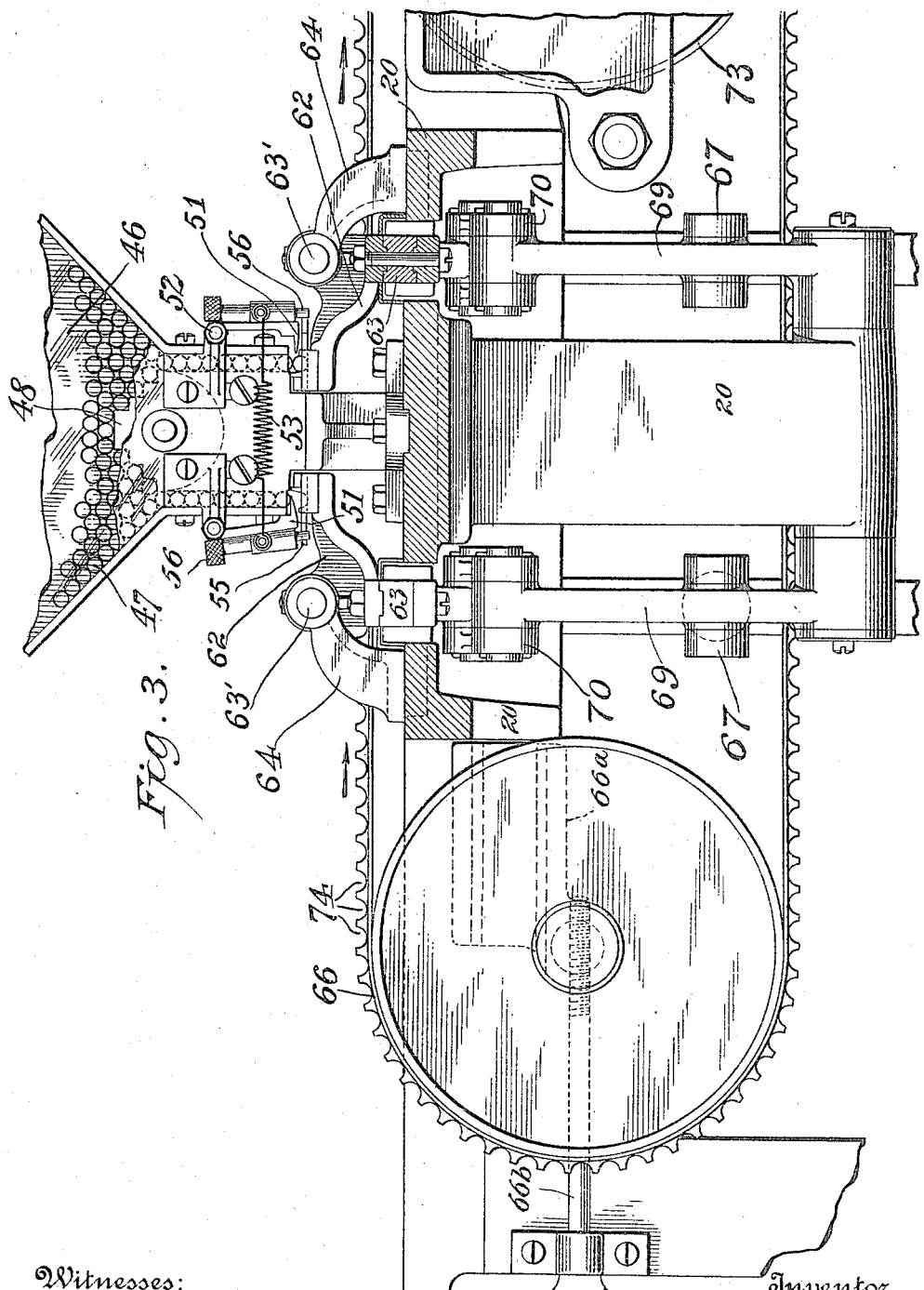
Fig. 3 is a cross section through the machine partly broken away, and illustrating the feed mechanism for feeding the cases, and showing part of the apparatus for operating the packed rods, which force the rods of tobacco into the cases.

In order to facilitate the filling of the cases I prefer to provide the delivery wall or side 43 of the mold with an opening opposite to the cavity in the mold, and I provide the mold with two case holders 44, which are preferably simply of tubular form having a bore constituting a substantial continuation of the bore or cavity of the mold. Arrangement is provided for feeding the cases alternately onto these holders 44, the preferred mechanism for this purpose being illustrated in Figs. 9 and 10. It comprises a hopper 45 preferably having a transparent wall 46 through which the cases 47 on the interior may be seen. The width of the hopper is just sufficient to enable the cigarette cases to arrange themselves in parallel arrangement in a single tier or bank. In order to insure that the cases are fed down properly I prefer to provide a jogger 48 on the interior of the hopper having shelving sides and arranged to be slightly rocked by means of an arm 49 and a link 50 which connects with some moving part of the machine, such as part of the shower feed apparatus 23$^a$. The lower part of the hopper may be closed by two movable gates 51 which are mounted on pivots 52 and normally held in their closed position by a connecting spring 53 preferably arranged as illustrated in Fig. 3. These gates are preferably opened alternately, and operated to deliver the cases one by one onto case feeding mechanism which advances the cases and positions the same on case holders 44. This is preferably accomplished by means of mechanism such as that illustrated in Fig. 9 and comprising semi-tubular carriers 54 which are adapted to move back and forth under the gates.

As each holder passes under its corresponding gate in a forward direction a cam carried by it strikes a pin 56 at the lower part of the gate, and throws the gate open so as to deposit a single case in the semi-tubular carrier 54. This semi-tubular carrier 54 is in alinement with its corresponding holder 44 so that as it finishes its movement it shoves the case onto the case holder. In order to assist in holding the case on the case holder as the carrier 54 withdraws, I prefer to provide a lateral pressing device 57, such as that illustrated in Figs. 13 to 15, comprising an arm 58 pressed down by a weight 58$^a$, and having a roller 59 which normally rests on the upper side of the holder 44. As the carrier 54 comes forward a cam edge 60, which is formed upon its forward part strikes a corresponding edge 61 on the arm 58 and raises the arm slightly and then as it withdraws permits the arm to return and hold the case by means of the roller. The pins 56 which coöperate with the cams are preferably arranged so that they may be pulled up when desired so that they are out of the paths of the cams; and when in this position, of course, the case feeders can operate without advancing any cases, that is, they will not open the gates. These case feeders are preferably secured by brackets 62 to slides 63, which are mounted on the aforesaid guides 22, and these brackets 62 may be guided above on longitudinally disposed guide rods 63' and held between fixed brackets 64 mounted on the frame of the machine.

Figure 2:
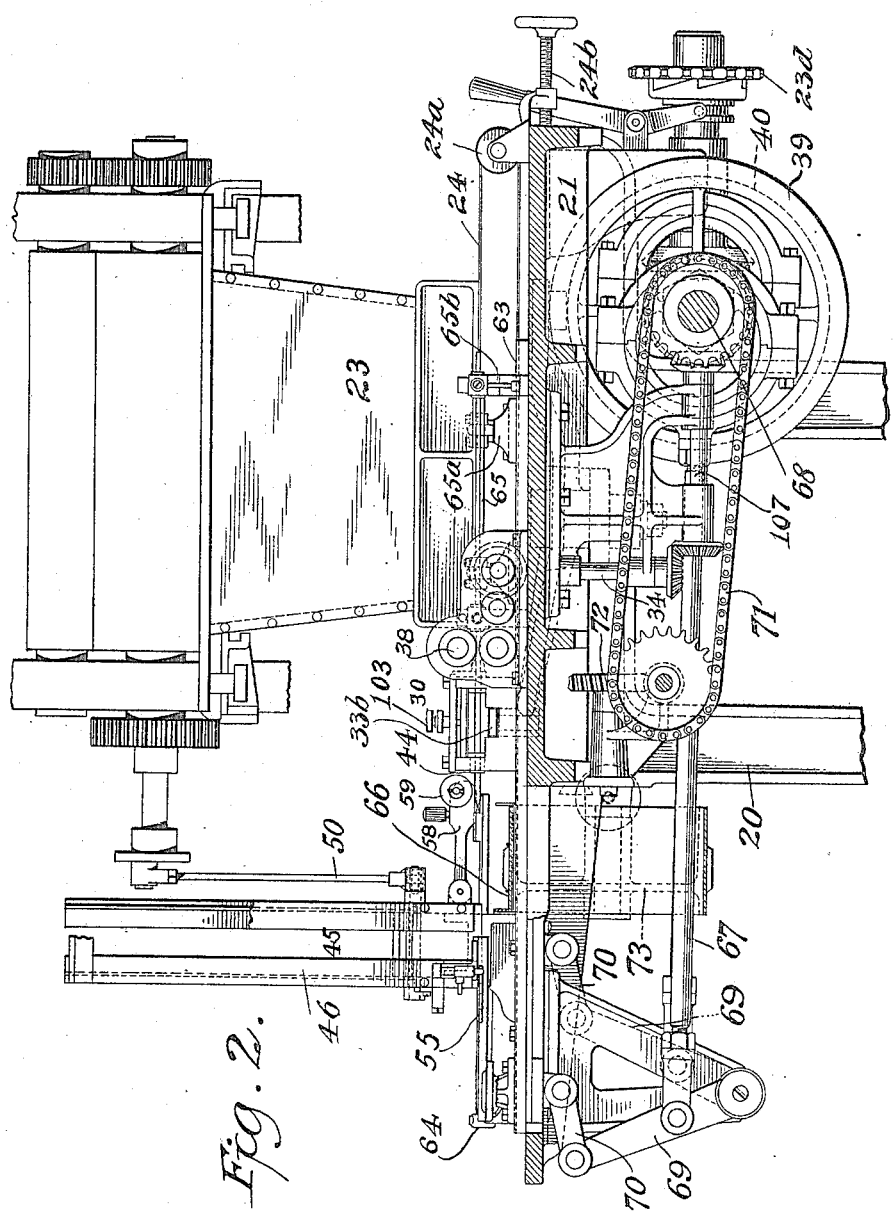
Fig. 2 is a longitudinal vertical cross section through the machine taken about on the line 2—2 of Fig. 1.

In order to force the tobacco rods into the cases I prefer to provide two packer rods 65 which pass longitudinally into the case and force the tobacco rod longitudinally out through the holder 44 and into the case mounted on the holder. The movement of the packer rod is sufficient to carry the case completely off the holder and when the packer rod withdraws the filled case is stripped off and falls onto a delivery belt 66, as shown in Fig. 15. Adjacent this point a flange guide plate 66$^d$ is provided for the belt. The packer rods 65 are attached to the aforesaid slides 63 respectively by brackets 65$^a$ and guided through guide brackets 65$^b$, so that when one packer rod is going forward the other is going back as indicated by the arrows in Fig. 12. Any suitable means may be provided for reciprocating these slides. This is preferably accomplished, however, by means of eccentric rods 67 leading from the shaft 68, as shown in Fig. 2, said eccentric rods being connected with levers 69 having links 70 which are pivotally connected with the slides. The delivery belt 66 may be driven in any suitable manner from the shaft 68, such as by means of a sprocket chain 71 and gearing 72, which drives a large pulley 73 over which the belt runs.

The opposite pulley 73' is mounted on a slide block 66$^a$ which may be adjusted by screw 66$^b$ for tightening the belt.

As the cigarettes are carried by the belt away from the mold they are alined by a plate 66$^c$ (Fig. 1).

Figure 4:
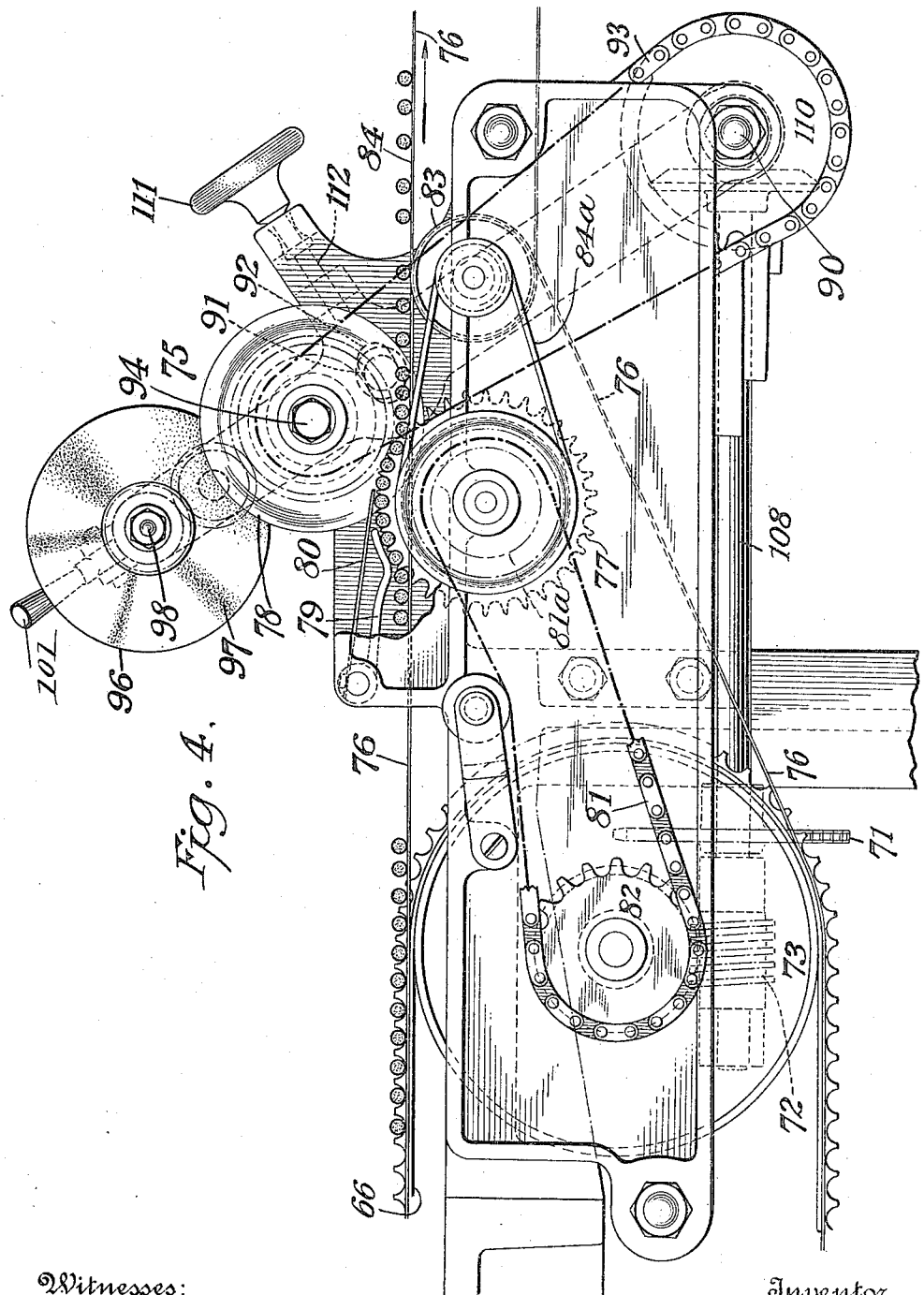
Fig. 4 is a front elevation showing part of the machine, and particularly illustrating the means for cutting the cigarette to uniform length.
Figure 5:
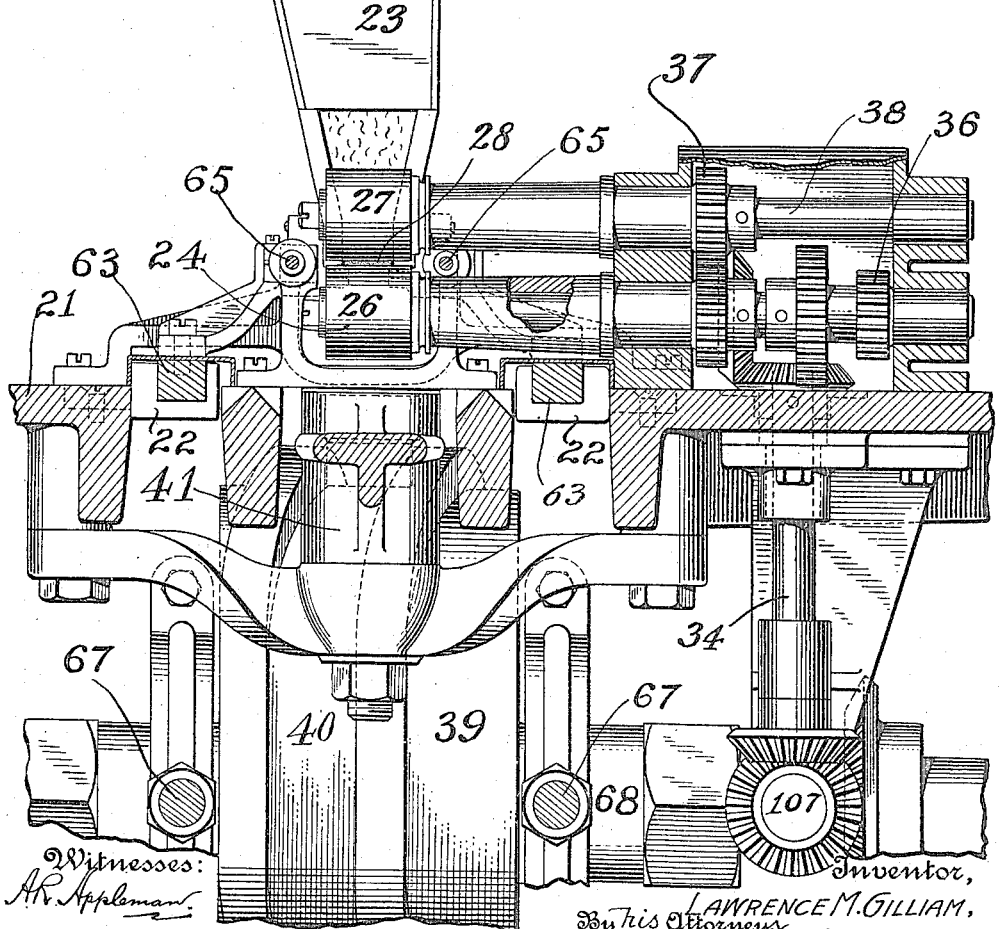
Fig. 5 is a cross section through the machine, certain parts being broken away, and particularly illustrating the rollers of compressing means which receive the ribbon of tobacco and which pass it into the mold.

The belt 66 is preferably formed on its outer side with transverse pockets 74 into which the cigarettes fall individually. This belt carries the cigarettes toward the trimming mechanism 75, which is illustrated in Figs. 4 and 11. In order to carry the cigarettes to the trimming mechanism I prefer to provide two horizontally guided cords 76, which pass along the upper and lower sides of belt 66 but pass beyond the belt 66 at its delivery end in such a way that as the belt 66 turns to pass around its guide pulley adjacent the trimming mechanism, the cords 76 carry on the cigarettes toward a drum 77 having pockets in its periphery which present the cigarettes in succession to the edge of a knife 78 preferably in the form of a rotary cutting disk. One of the cords 76 passes across the end of the drum 77 and the other cord passes the drum in a deep circumferential groove 77$^d$ in the drum. The edge of this knife may lie adjacent the edge of the drum, and when the knife is operating the cigarettes are held against displacement by guards 79 and 80 extending over the drum. The drum 77 may be driven by a suitable sprocket wheel 81$^a$ and chain 81 from a sprocket wheel 82; the cords 76 pass around a pulley 83 which carries a delivery belt 84 driven by belt 84$^a$ from the drum shaft, and this belt 84 receives the cigarettes from the cords after the cigarettes have been trimmed.

In order to aline the cigarettes so that they are all trimmed to uniform length, I prefer to provide a guide preferably in the form of a plate 85 mounted on an adjustable stem 86, which is pressed by a spring 87 toward the cutter 78, and may be adjusted away from the cutter by screwing up a thumb-nut 88. The trimming mechanism is preferably mounted on a trimmer frame 89, which is pivotally supported on a stud 90 on the main frame, so that the entire frame may be adjusted in or out so as to adjust the position of the cutter 78 with respect to the drum 77. The trimmer frame may be clamped in any desired position by means of a clamping bolt 91 passing through a slot 92.

The cutter 78 may be driven in any suitable manner such as that illustrated, comprising a sprocket chain 93, which drives the shaft 94 of the cutter. The cutter is preferably pressed by a spring 95 against the end of the drum so that it may yield slightly away from the drum as it severs the ends of the cigarettes opposite the mouthpiece.

I provide means for sharpening the cutter when desired without taking it from the cutter frame, for which purpose I prefer to provide a sharpening wheel 96 having a beveled face preferably covered with some abrasive material 97, such as emery paper. The shaft 98 of the sharpening wheel is longitudinally movable toward the cutter and may be driven by gearing 99 from the shaft of the cutter. A spring 100 which may be coiled about the shaft 98 of the sharpening wheel tends to hold the sharpening wheel away from the cutter. A lever 101 engages the end of the shaft 98 remote from the cutter and when moved in the right direction will force the sharpening wheel against the cutter.

I provide an arrangement whereby the operation of the mold can be observed by the operator of the machine. For this purpose I prefer to cover the mold with a transparent plate 102 which preferably seats directly on the upper faces of the fixed mold parts 31, and which may be secured in position by suitable clamping screws 103. The preferred arrangement for this purpose is illustrated in Figs. 7 and 8. In this way it will be seen that the plate is attached in a plane directly over the plane of movement of the movable mold part 33.

The preferred general driving arrangement for the mechanism is most clearly illustrated in Fig. 1. The main shaft 68 carries a combination pulley and clutch 104, the clutch whereof may be controlled by hand wheel 105. Adjacent the clutch there is provided a large hand wheel 106 by means of which the machine may be turned over without the use of power. The vertical shaft 34, which drives the tobacco feed belt 24 is driven through suitable beveled gears connected with a shaft 107. The sprocket chain 93 which drives the cutter 78 is driven from a shaft 108, which is driven by sprocket chain 71 from the shaft 68. The shaft 108 drives beveled gears 109, which drive a sprocket wheel 110 around which the sprocket chain 93 passes. The delivery belt 66 is driven through the rotation of pulley 110 at the right, the shaft of which is driven through the gearing 72 from the sprocket chain 71.

The frame of the machine adjacent the trimmer frame 89 is provided with a hand wheel 111 carrying an adjusting screw 112 by means of which the angular position of the trimmer frame can be adjusted before clamping the same in a fixed position by the clamping bolt 91. This adjustment enables the cutter to be moved transversely toward or away from the axis of the cigarettes to be cut.

It is understood that the embodiment of the invention described above is only one of the many embodiments or forms the invention may take, and I do not wish to be limited in the practice of the invention, nor in my claims, to the particular embodiment set forth.

What I claim is:—

1. In a machine of the class described, in combination, a tobacco hopper having a slot in the bottom thereof, a mold open at one end and having separated mold parts, a belt having a continuous variable movement longitudinally at said slot in the direction of the open end of said mold, a roller adjacent said mold around which said belt passes, a second roller disposed over said first roller for compressing the tobacco in the form of a ribbon and directing the ribbon into the open end of the mold, a movable mold part, means for reciprocating said movable mold part between said separated mold parts, said movable part operating to shear a length of tobacco from the ribbon and condense the same across the flat side of the ribbon and coöperating with one or the other of said separated mold parts to compress the tobacco into a rod, means for holding the cigarette cases to be filled, and means for ejecting the compressed tobacco from the mold into the cases.

2. In a cigarette machine, in combination, a pair of mold parts, a movable mold part, means for moving said movable mold part to coöperate with said first named mold parts alternately and compress a portion of the tobacco, feeding mechanism for uninterruptedly feeding the tobacco into the mold, said feeding mechanism having means for increasing the velocity of the feed when said movable mold part is pressing the tobacco against one of said pair of mold parts.

3. In a cigarette machine, in combination, a mold comprising a pair of mold parts and a movable mold part, means for moving said movable mold part to coöperate with said first named mold parts alternately to compress a portion of the tobacco, feeding mechanism for feeding the tobacco into the mold, said feeding mechanism having means for increasing the velocity of the feed when said movable mold part is pressing the tobacco against one of said pair of mold parts.

4. In a cigarette machine, in combination, a mold including a movable mold part, means for moving said movable mold part to coöperate with said first named mold parts alternately to compress a portion of the tobacco, feeding mechanism for feeding the tobacco into the mold, said tobacco feeding mechanism including a pair of constantly rotating rollers adjacent the said mold between which the tobacco passes, and means for varying the speed of rotation of said rollers.

5. In a cigarette machine, in combination, a pair of rollers for pressing and advancing the tobacco into the mold, means for constantly rotating said rollers, including elliptical gears for driving said rollers alternately at a high speed of rotation and a slow speed of rotation, and a movable mold part, moving transversely to the direction of the tobacco moving into the mold, for compressing the tobacco in the mold, and means for moving said movable mold part across the path of tobacco when said rollers are moving at their slow speed of rotation.

6. In a cigarette machine, in combination, a pair of rollers for pressing and advancing the tobacco into the mold, means for constantly rotating said rollers, including elliptical gears for driving said rollers alternately at a high speed of rotation and a slow speed of rotation, and a movable mold part moving transversely to the direction of the tobacco moving into the mold, for compressing the tobacco in the mold, and means for moving said movable mold part at a high speed across the path of tobacco when said rollers are moving at their slow speed of rotation.

7. In a machine of the class described, in combination, a tobacco feeding hopper having a slot gradually decreasing in width, a mold near the wider end of said slot, a belt running in the direction of said mold at said slot to receive the tobacco through said slot operating to advance the tobacco in said slot in the direction of said mold, and rollers at the end of the belt near said mold for feeding the tobacco from the belt into said mold.

8. In a machine of the class described, in combination, a mold having a wall with an elongated opening therein, means for uninterruptedly feeding a continuous flat ribbon of tobacco into said mold through said opening, and a mold member movable across said opening to shear a portion of the ribbon at said opening and for condensing and compressing the sheared portion of the ribbon thereafter in a direction across the flat of the ribbon.

9. In a machine of the class described, in combination, a tobacco hopper having a slot in the bottom thereof, a mold having separated mold parts, a belt moving longitudinally at said slot in the direction of said mold, a roller adjacent to said mold around which said belt passes, a second roller disposed over said first roller for compressing the tobacco as it passes into said mold, a movable mold part and means for reciprocating said movable mold part between said separated mold parts, said movable part operating to shear a length of tobacco from the ribbon and coöperating with one or the other of said separated mold parts to compress the tobacco into a rod, means for holding the cigarette cases to be filled and means for forcing the compressed tobacco from the mold into the cases, said tobacco feeding means having a construction such that said ribbon moves slowly when said movable mold part is shearing the tobacco and moves rapidly when said movable mold part is compressing the tobacco.

10. In a machine of the class described, in combination, means for uninterruptedly feeding forward a continuous ribbon of tobacco including a variable speed device for advancing the ribbon alternately at a high speed and at a low speed, and means for severing a length of tobacco from the ribbon while the ribbon is moving at a slow speed.

11. In a machine of the class described, in combination, means for uninterruptedly feeding forward a continuous ribbon of tobacco including a variable speed device for advancing the ribbon alternately at a high speed and at a low speed, means for severing a length of tobacco from the ribbon while the ribbon is moving at a slow speed, and means coöperating with said last named means for compressing the severed portion of the ribbon while the ribbon is advancing at a high speed.

12. In a cigarette stuffing machine, in combination, means for forming tobacco into a ribbon, plural compressing means for compressing sections of the ribbon into cigarette rod lengths, means for uninterruptedly feeding the ribbon to the compressing means, and means for operating the feeding means at a variable speed.

13. In a machine of the class described, in combination, a mold comprising separated mold parts, means for uninterruptedly feeding forward a continuous ribbon of tobacco into the space between said mold parts, a movable mold part reciprocating between said separated mold parts, operating to cut off a portion of said ribbon and compress the same against one or the other of said separated mold parts, slides corresponding to said separated mold parts, means for supporting the cigarette cases adjacent the said separated mold parts, and means carried by said slides for forcing the tobacco alternately from the two sides of the mold into the cigarette cases.

14. In a machine of the class described, in combination, a mold comprising a pair of separated mold parts, a movable part reciprocating between said separated mold parts for compressing the tobacco against said separated mold parts into rod formation, a case hopper, holders for the cigarette cases adjacent said separated mold parts, carriers moving adjacent said hopper, means for automatically feeding cases one at a time onto said carriers from said hopper, said carriers operating to place said cases on said case holders, pivotally mounted weighted arms each having a roller, and freely movable to engage the cases positioned on said holders to prevent their dislodgment when being filled with the tobacco rod, and means on the carriers for automatically displacing said rollers to permit the placing of the cases on their holders.

In testimony whereof I have hereunto set my hand in presence of two subscribing witnesses.

LAWRENCE M. GILLIAM.

Witnesses:
 N. W. MINEREN,
 R. D. FRISSELLE.

Copies of this patent may be obtained for five cents each, by addressing the "Commissioner of Patents, Washington, D. C."